(12) United States Patent
Akaho et al.

(10) Patent No.: US 12,413,149 B2
(45) Date of Patent: Sep. 9, 2025

(54) POWER SUPPLY CONTROL APPARATUS AND SWITCHING POWER SUPPLY INCLUDING THE SAME

(71) Applicant: ROHM CO., LTD., Kyoto (JP)

(72) Inventors: Tadashi Akaho, Kyoto (JP); Yasuto Yoshioka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 218 days.

(21) Appl. No.: 18/449,757

(22) Filed: Aug. 15, 2023

(65) Prior Publication Data

US 2024/0113626 A1  Apr. 4, 2024

(30) Foreign Application Priority Data

Sep. 29, 2022  (JP) ................. 2022-156153

(51) Int. Cl.
*H02M 3/158* (2006.01)
*H02M 1/00* (2006.01)

(52) U.S. Cl.
CPC ....... *H02M 3/1588* (2013.01); *H02M 1/0032* (2021.05)

(58) Field of Classification Search
CPC .......................... H02M 3/1588; H02M 1/0032
See application file for complete search history.

(56) References Cited

U.S. PATENT DOCUMENTS

2003/0201760 A1* 10/2003 Umemoto ............. H02M 3/156
                                                    323/271
2018/0019671 A1*  1/2018 Li ......................... H02M 1/00

FOREIGN PATENT DOCUMENTS

JP    2015-177722    10/2015
JP    2020-096408     6/2020

* cited by examiner

*Primary Examiner* — Kyle J Moody
(74) *Attorney, Agent, or Firm* — Fish & Richardson P.C.

(57) ABSTRACT

A power supply control apparatus, includes: a driver configured to respectively drive an output transistor and a synchronous rectification transistor configured to generate an output voltage from an input voltage and supply the output voltage to a load; and a controller configured to, in a light load mode in which output feedback control is performed such that a switching frequency of the output transistor becomes lower as the load becomes lighter, during an off period from a time at which both the output transistor and the synchronous rectification transistor are turned off to an on timing of the output transistor based on the output feedback control, periodically turn on the synchronous rectification transistor within a range in which the switching frequency does not fall below a predetermined lower limit value.

6 Claims, 3 Drawing Sheets

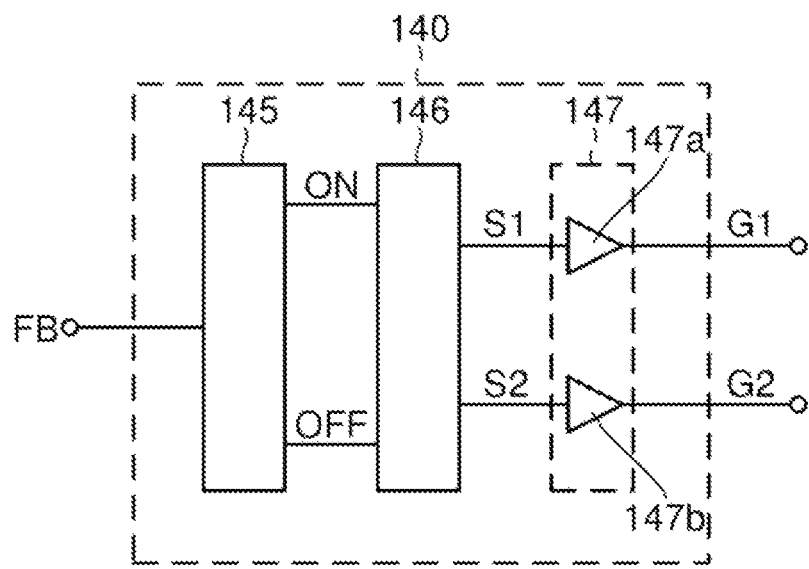
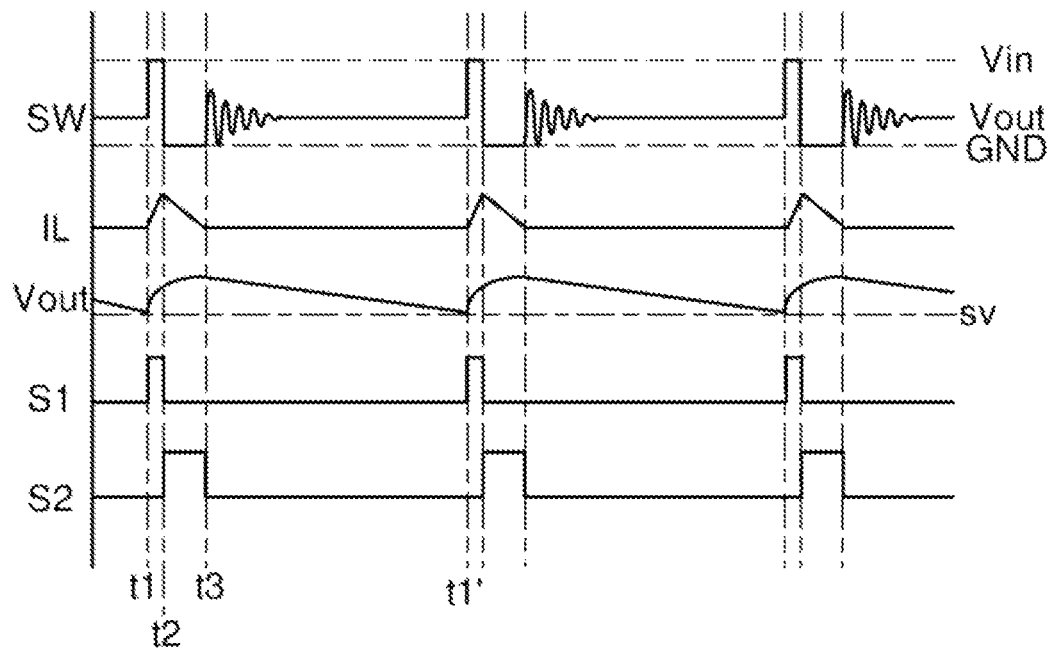

POWER SUPPLY CONTROL APPARATUS AND SWITCHING POWER SUPPLY INCLUDING THE SAME

CROSS-REFERENCE TO RELATED APPLICATION

This application is based upon and claims the benefit of priority from Japanese Patent Application No. 2022-156153, filed on Sep. 29, 2022, the entire contents of which are incorporated herein by reference.

TECHNICAL FIELD

The present disclosure relates to a power supply control apparatus and a switching power supply provided with the same.

BACKGROUND

In the related art, among switching power supplies, there is a switching power supply that has an operation mode (so-called light load mode) in which switching pulses are thinned out at a light load to reduce switching loss. In the related art, during the light load mode, a switching frequency fluctuates according to a load current. Therefore, depending on an amount of load current, the switching frequency may drop to a human audible range (generally 20 kHz or less), and input and output capacitors may generate an offensive sound (so-called switching power supply noise).

As a method of preventing a noise in a switching power supply, for example, it is conceivable that when a noise prevention function is turned on, a load resistor provided inside a power supply control IC is connected to a switch output stage to increase the load current and intentionally raise the switching frequency.

In the related art, as such a switching power supply, there is known a switching power supply including a load resistor circuit. The load resistor circuit of this switching power supply is provided inside the power supply control IC and connected to the switch output stage. The load resistor circuit is configured to detect a feedback voltage (a divided voltage of the output voltage generated by the switch output stage) and change the load current according to a value of the feedback voltage.

BRIEF DESCRIPTION OF DRAWINGS

The accompanying drawings, which are incorporated in and constitute a part of the specification, illustrate embodiments of the present disclosure.

FIG. 2 is a diagram showing a configuration example of a control circuit.

FIG. 3 is a timing chart showing a switching operation in a light load mode.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Embodiments of the present disclosure will be described below with reference to the drawings.

<Switching Power Supply>

Figure 1:
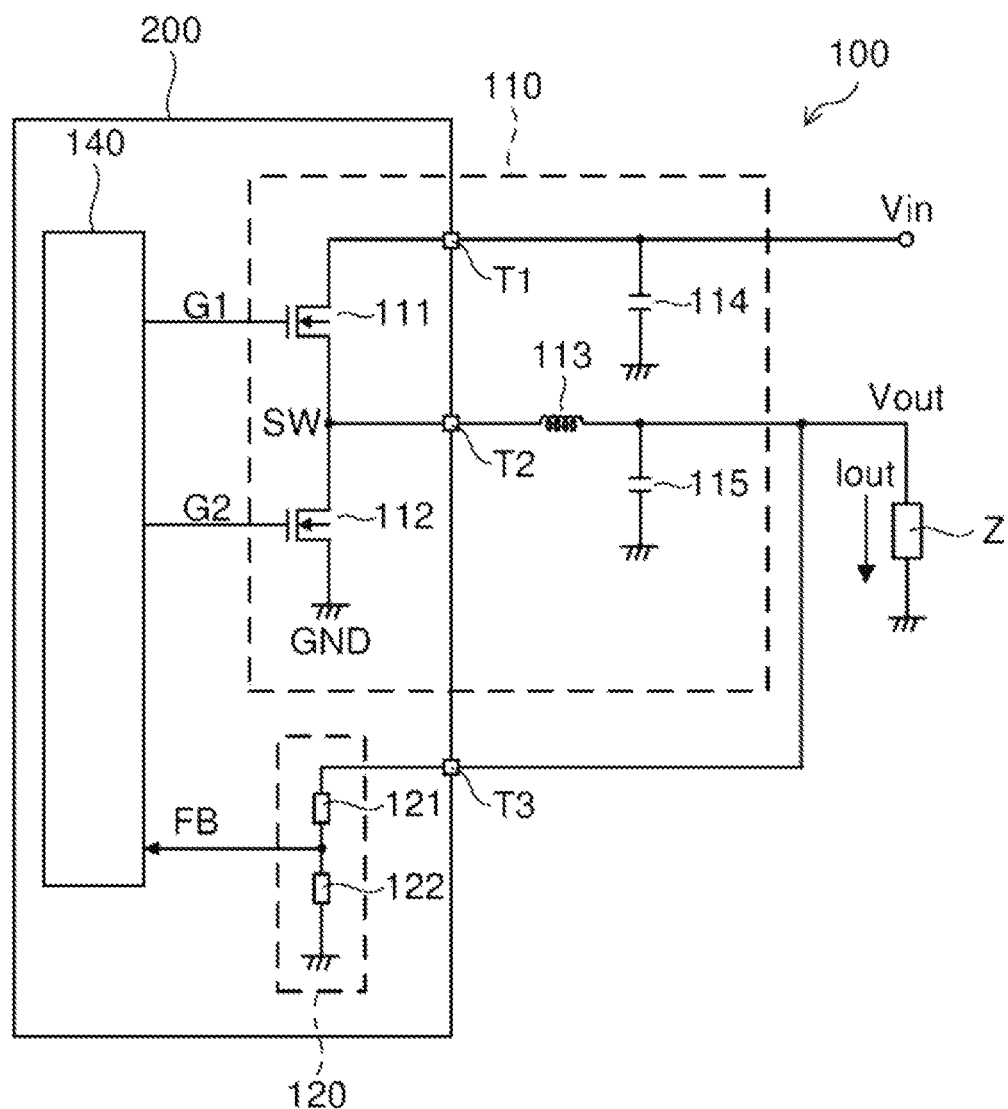
FIG. 1 is a diagram showing an embodiment of a switching power supply.

FIG. 1 is a diagram showing an embodiment of a switching power supply. The switching power supply 100 of the present embodiment is a DC/DC converter configured to generate a desired output voltage Vout from an input voltage Vin and supply the output voltage Vout to a load Z. The switching power supply 100 includes a control circuit 140 (power supply control apparatus), a switch output stage 110, and a feedback voltage generation circuit 120.

Except for some components (in this figure, an inductor 113 and capacitors 114 and 115) included in the switch output stage 110, the above-described components may be integrated into a semiconductor device 200 (so-called power supply control IC) configured to mainly control the switching power supply 100. The semiconductor device 200 may appropriately incorporate arbitrary components (such as various protection circuits) other than those described above. The semiconductor device 200 also includes a plurality of external terminals T1 to T3 as means configured to establish electrical connection to the outside of the device.

The switch output stage 110 is a step-down type switch output stage configured to drive an inductor current IL to generate a desired output voltage Vout from an input voltage Vin by turning on and off upper and lower switches connected to form a half bridge. The switch output stage 110 includes an output transistor 111, a synchronous rectification transistor 112, an inductor 113, and capacitors 114 and 115.

The output transistor 111 is an NMOSFET [N-channel type metal oxide semiconductor field effect transistor]. The output transistor 111 functions as an upper switch of the switch output stage 110.

Inside the semiconductor device 200, a drain of the output transistor 111 is connected to an external terminal T1 (a terminal to which an input voltage Vin is applied). A source of the output transistor 111 is connected to an external terminal T2 (a terminal to which a switch voltage SW is applied). A gate of the output transistor 111 is connected to a terminal to which an upper gate signal G1 is applied.

The output transistor 111 is turned on when the upper gate signal G1 is at a high level, and is turned off when the upper gate signal G1 is at a low level. When an NMOSFET is used as the output transistor 111, a bootstrap circuit or a charge pump circuit (not shown in this figure) is required to raise the high level of the upper gate signal G1 to a voltage value higher than the input voltage Vin.

The synchronous rectification transistor 112 is an NMOSFET. The synchronous rectification transistor 112 functions as a lower switch of the switch output stage 110.

Inside the semiconductor device 200, the drain of the synchronous rectification transistor 112 is connected to the external terminal T2 (the terminal to which the switch voltage SW is applied). The source of the synchronous rectification transistor 112 is connected to a ground terminal (a terminal to which a ground voltage GND is applied). The gate of the synchronous rectification transistor 112 is connected to a terminal to which a lower gate signal G2 is applied.

The synchronous rectification transistor 112 is turned on when the lower gate signal G2 is at a high level, and is turned off when the lower gate signal G2 is at a low level.

The inductor 113 and the capacitors 114 and 115 are discrete components externally attached to the semiconductor device 200. A first end of the capacitor 114 is connected to the external terminal T1 of the semiconductor device 200. A second end of the capacitor 114 is connected to the ground terminal.

A first end of the inductor 113 is connected to the external terminal T2 of the semiconductor device 200. A second end of the inductor 113 and a first end of the capacitor 115 are connected to the terminal to which the output voltage Vout is applied and an external terminal T3 of the semiconductor device 200.

A second end of the capacitor 115 is connected to the ground terminal. The capacitor 114 functions as an input capacitor configured to smooth the input voltage Vin. Further, the inductor 113 and the capacitor 115 function as an LC filter configured to rectify and smooth the switch voltage SW to generate the output voltage Vout.

The output transistor 111 and the synchronous rectification transistor 112 are basically turned on and off in a complementary manner according to the upper gate signal G1 and the lower gate signal G2. By such an on/off operation, a square-wave switch voltage SW pulse-driven between the input voltage Vin and the ground voltage GND is generated at the first end of the inductor 113. The word "complementary" mentioned above should be understood as including not only a case where the on/off states of the output transistor 111 and the synchronous rectification transistor 112 are completely reversed, but also a case where there is provided a period (dead time) in which the output transistor 111 and the synchronous rectification transistor 112 are simultaneously turned off. Further, during a light load mode described later, both the output transistor 111 and the synchronous rectification transistor 112 are turned off, and the driving of the switch output stage 110 may be temporarily stopped (details of which will be described later).

Further, the output transistor 111 may be replaced with a PMOSFET. In such a case, the aforementioned bootstrap circuit and charge pump circuit become unnecessary.

It is also possible to externally attach the output transistor 111 and the synchronous rectification transistor 112 to the semiconductor device 200. In such a case, instead of the external terminal T2, external terminals configured to output the upper gate signal G1 and the lower gate signal G2 to the outside of the device are required.

Further, when a high voltage is applied to the switch output stage 110, a high-voltage element such as a power MOSFET, an IGBT (insulated gate bipolar transistor), and a SiC transistor may be used as the output transistor 111 or the synchronous rectification transistor 112.

The feedback voltage generation circuit 120 includes resistors 121 and 122 connected in series between the external terminal T3 (a terminal to which the output voltage Vout is applied) and the ground terminal. A feedback voltage FB (divided voltage of the output voltage Vout) corresponding to the output voltage Vout is outputted from a connection node between the resistors 121 and 122.

When the output voltage Vout falls within an input dynamic range of the control circuit 140, the feedback voltage generation circuit 120 may be omitted and the output voltage Vout itself may be directly inputted to the control circuit 140 as the feedback voltage FB.

<Control Circuit>

As basic output feedback control, the control circuit 140 performs a pulse width modulation control (PWM control) of the upper gate signal G1 and the lower gate signal G2 such that the feedback voltage FB matches a predetermined target value.

The control circuit 140 also has a light load mode (PFM (pulse frequency modulation) control) in which a switching loss is reduced by repeatedly stopping and restoring the drive of the switch output stage 110 within a range in which the output voltage Vout does not fall below the target value.

Further, the control circuit 140 may perform a silent light load mode during the light load mode. The silent light load mode is a function that periodically turns on the synchronous rectification transistor 112 such that the switching frequency does not fall below a lower limit value in the light load mode (details of which will be described later). The lower limit value is a frequency at which the switching power supply 100 does not generate a noise, and is, for example, about 21 to 25 kHz, which is higher than the human audible band.

FIG. 2 is a diagram showing a configuration example of the control circuit 140. As shown in FIG. 2, the control circuit 140 includes a signal controller 145 (controller), a logic circuit 146, and a drive circuit (driver) 147.

The signal controller 145 transmits an on signal ON (clock signal) and an off signal OFF to the logic circuit 146 according to the magnitude of the feedback voltage FB. The logic circuit 146 basically generates an upper control signal S1 and a lower control signal S2 according to the on signal ON and the off signal OFF.

The drive circuit 147 includes an upper driver 147a and a lower driver 147b. The upper driver 147a receives the input of the upper control signal S1 and generates the upper gate signal G1. The lower driver 147b receives the input of the lower control signal S2 and generates the lower gate signal G2. A buffer or an inverter may be used as the upper driver 147a and the lower driver 147b, respectively.

When the signal controller 145 generates the on signal ON, the logic circuit 146 raises the upper control signal S1 to a high level and lowers the lower control signal S2 to a low level. As a result, the output transistor 111 is turned on and the synchronous rectification transistor 112 is turned off. Then, the switch voltage SW rises to a high level (=Vin). This state is called a first phase.

On the other hand, when the signal controller 145 generates the off signal OFF, the logic circuit 146 lowers the upper control signal S1 to a low level and raises the lower control signal S2 to a high level. As a result, the output transistor 111 is turned off and the synchronous rectification transistor 112 is turned on. Then, the switch voltage SW falls to a low level (≈GND). This state is called a second phase.

In the pulse width modulation control, the control circuit 140 controls the switch output stage 110 such that the above-described first phase and second phase alternately continue. Therefore, the on time of the output transistor 111 (the high level period of the switch voltage SW) is controlled such that the on time becomes longer as the pulse generation timing of the off signal OFF becomes delayed, and the on time becomes shorter as the pulse generation timing of the off signal OFF becomes faster.

On the other hand, in the light load mode, the control circuit 140 controls the switch output stage 110 so as to include a third phase in addition to the first and second phases described above. In the third phase, the output transistor 111 and the synchronous rectification transistor 112 are turned off, such that the switch output stage 110 enters into a non-driving state (switch voltage SW-output voltage Vout).

Operation Example in Light Load Mode

FIG. 3 is a timing chart showing the switching operation in the light load mode. In FIG. 3, the switch voltage SW, the inductor current IL, the output voltage Vout, the upper control signal S1, and the lower control signal S2 are depicted in order from the top. The control circuit 140 executes the light load mode when the load current Iout flowing through the load Z falls below a predetermined value. The light load mode will be specifically described below with reference to FIG. 3.

When the output voltage Vout drops to a reference voltage sv (time t1 in FIG. 3), the logic circuit 146 raises the upper control signal S1 to a high level and lowers the lower control signal S2 to a low level. As a result, the state of the first phase described above is entered, and the output voltage Vout rises.

When the on-time of the output transistor 111 elapses for a predetermined time (time t2 in FIG. 3), the logic circuit 146 lowers the upper control signal S1 to a low level and raises the lower control signal S2 to a high level. As a result, the state of the second phase described above is entered.

When the inductor current IL becomes 0 or negative (time t3 in FIG. 3), the logic circuit 146 lowers the upper control signal S1 and the lower control signal S2 to a low level. As a result, the state of the third phase described above is entered. Thereafter, the output voltage Vout gradually decreases with a slope corresponding to the load current Iout flowing through the load Z.

When the output voltage Vout drops to the reference voltage sv again (time t1' in FIG. 3), the logic circuit 146 raises the upper control signal S1 to a high level and keeps the lower control signal S2 at a low level. As a result, the state of the first phase described above is entered again. Likewise, the control circuit 140 controls the switch output stage 110 in the light load mode such that the states of the first to third phases are repeated in the above-described order.

In the light load mode, the period from the time (time t3 in FIGS. 3 and 4) when both the output transistor 111 and the synchronous rectification transistor 112 are turned off to the next turn-on timing of the output transistor 111 (time t1' in FIGS. 3 and 4) is called an "off period." In the silent light load mode described later, the output transistor 111 may turn off and the synchronous rectification transistor 112 may turn on during the off period.

When a time interval between the first phase and the next first phase (interval between time t1 and time t1' in FIG. 3) exceeds a predetermined time in the light load mode, i.e., when the switching frequency falls below the lower limit value, the control circuit 140 makes the silent light load mode valid.

Operation Example of Silent Light Load Mode

Figure 4:
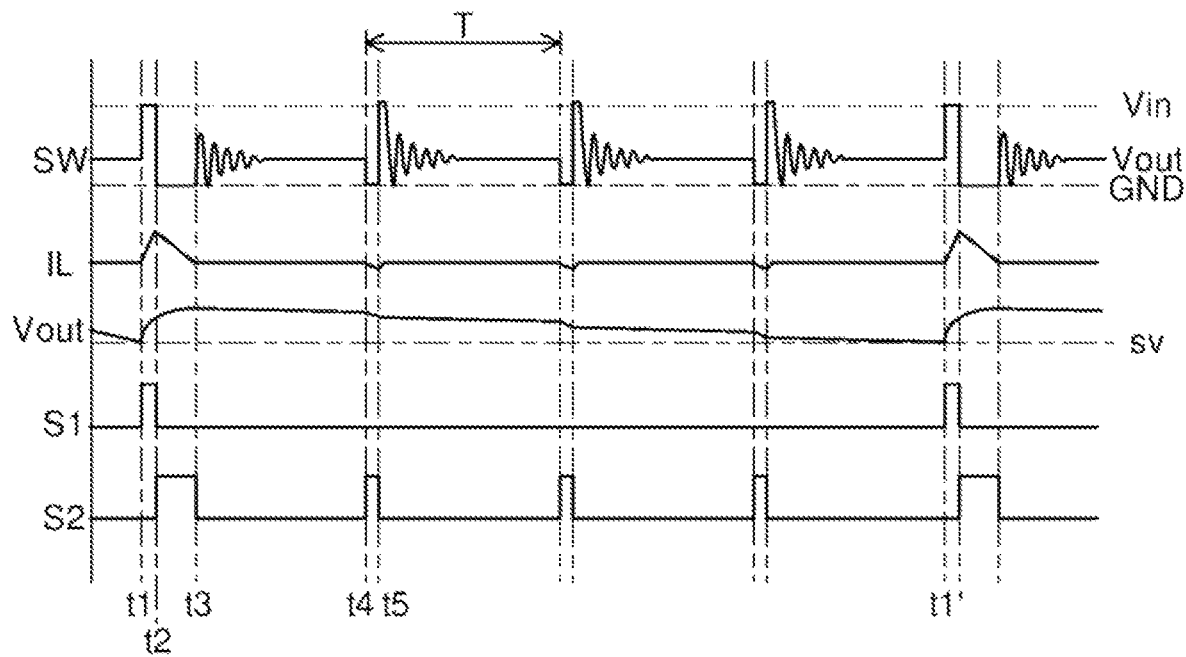
FIG. 4 is a timing chart showing a switching operation of a switch output stage in a silent light load mode.

FIG. 4 is a timing chart showing the switching operation of the switch output stage 110 in the silent light load mode. The silent light load mode will be specifically described below with reference to this figure.

As described above, the control circuit 140 controls the switch output stage 110 to sequentially transition to the first phase, the second phase, and the third phase in the light load mode. When the silent light load mode is made valid, the control circuit 140 periodically turns on the synchronous rectification transistor 112 during the off period (period from time t3 to time t1' in FIG. 4).

More specifically, in the state of the third phase (time t3 in FIG. 4), the logic circuit 146 keeps the upper control signal S1 at a low level and raises the lower control signal S2 to a high level at a predetermined timing (time t4 in FIG. 4). As a result, the synchronous rectification transistor 112 is turned on while the output transistor 111 is kept turned off. The on time of the synchronous rectification transistor 112 in this case (time period from time t4 to time t5 in FIG. 4) is shorter than the on time of the synchronous rectification transistor 112 in the second phase (time period from time t2 to time t3 in FIG. 4).

When the on time of the synchronous rectification transistor 112 elapses (time t5 in FIG. 4), the logic circuit 146 causes the lower control signal S2 to fall to a low level while keeping the upper control signal S1 at a low level. As a result, both the output transistor 111 and the synchronous rectification transistor 112 are turned off again.

At this time (time t5 in FIG. 4), the synchronous rectification transistor 112 is switched from on to off while the output transistor 111 kept turned off, thereby generating a counter electromotive force. More specifically, during the period from time t4 to time t5, an inductor current IL flows from the inductor 113 to the ground terminal via the synchronous rectification transistor 112. That is, the inductor current IL falls below a zero value. When the synchronous rectification transistor 112 is turned off, the inductor 113 attempts to keep the inductor current IL continuously flowing in the same direction as thus far (i.e., in the negative direction) due to the counter electromotive force generated in itself. As a result, a polarity of the switch voltage SW is switched from negative to positive.

In such a state, the charges stored in the capacitor 115 are returned to the input side via the inductor 113. Since the output transistor 111 is turned off at this time, the charges are returned to the input side via a body diode built in the output transistor 111.

The magnitude of the counter electromotive force is changed according to the on time of the synchronous rectification transistor 112 in this case (the time period from time t4 to time t5). More specifically, as the on time of the synchronous rectification transistor 112 becomes longer, the counter electromotive force becomes larger, and as the on time becomes shorter, the counter electromotive force becomes smaller.

The logic circuit 146 changes the on time (time period from time t4 to time t5 in FIG. 4) of the synchronous rectification transistor 112 during the off period within a range where the switch voltage SW rises close to the vicinity of the high level and the output voltage Vout does not fall below the reference voltage sv. The vicinity of the high level refers to a value at least within a range where the rise in the switch voltage SW affects the switching frequency.

Even after time t5, the logic circuit 146 periodically turns the synchronous rectification transistor 112 on and off until the turn-on timing (time t1' in FIG. 3) of the output transistor 111 based on the output feedback control is reached. For example, when the switching frequency is 25 kHz, the synchronous rectification transistor 112 is turned on and off by setting one period T to 40 µs.

During this time, the output transistor 111 is kept turned off. By periodically turning on the synchronous rectification transistor 112 during the off period as described above, the drive period of the switch output stage 110 is shortened and the switching frequency is increased.

As described above, in the light load mode, the logic circuit 146 periodically turns on the synchronous rectification transistor 112 during the off period. Therefore, it is possible to prevent the switching frequency from falling below the predetermined lower limit. Accordingly, by setting the lower limit value to be higher than the human audible band, it is possible to suppress the noise of the switching power supply 100.

In addition, in the silent light load mode, the on time of the synchronous rectification transistor 112 (the time period from time t4 to time t5 in FIG. 4) is relatively short, and the output voltage Vout does not fall below the reference voltage sv. Therefore, it is possible to prevent a reduction in efficiency by executing the silent light load mode and turning on the synchronous rectification transistor 112.

MODIFICATION

In addition to the above-described embodiments, various technical features described in the present disclosure may be modified in various ways without departing from the gist of the technical features. That is, the above-described embodiments should be considered as being exemplary and not restrictive in all respects. The technical scope of the present disclosure is not limited to the above-described embodiments and should be understood to include all changes falling within the meaning and range equivalent to the claims.

For example, mutual replacement of bipolar transistors with MOS field effect transistors and logic level inversion of various signals are optional.

Further, for example, in the above-described embodiments, in the silent light load mode, the output transistor 111 is kept turned off at the timing of turning off the synchronous rectification transistor 112 during the off period, and the switch voltage SW is raised to the vicinity of the high level by the counter electromotive force. However, the following configuration may be adopted.

Figure 5:
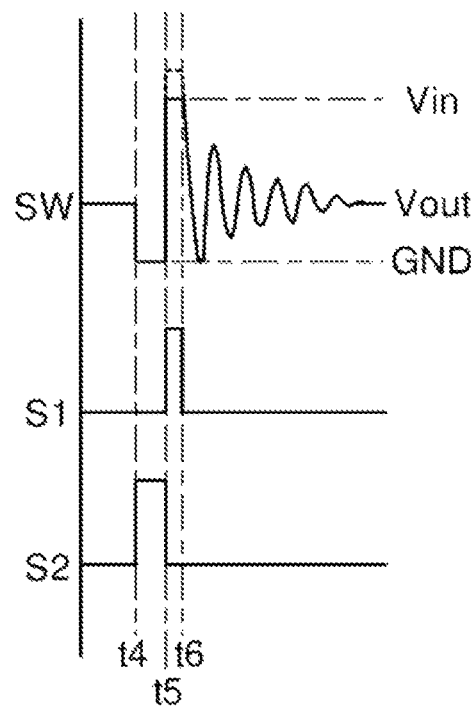
FIG. 5 is an enlarged view of a part of a timing chart showing a modification of the switching operation of the switch output stage in the silent light load mode.

FIG. 5 is an enlarged view of a part of the timing chart showing a modification of the switching operation of the switch output stage 110 in the silent light load mode. As shown in FIG. 5, in the silent light load mode, the logic circuit 146 raises the lower control signal S2 to a high level while keeping the upper control signal S1 at a low level during the off period (time t4 in FIG. 5). Thereafter, the lower control signal S2 is lowered to a low level and the upper control signal S1 is raised to a high level (time t5 in FIG. 5). As a result, the synchronous rectification transistor 112 is turned on while keeping the output transistor 111 turned off. Then, the output transistor 111 is turned on and the synchronous rectification transistor 112 is turned off. When the output transistor 111 is turned on and the synchronous rectification transistor 112 is turned off (between time t5 and time t6 in FIG. 5), the switch voltage SW becomes equal to the input voltage Vin and is lower than the raised value due to the above-described counter electromotive force (portion indicated by the dashed line in the graph of FIG. 5).

The reason is that the current flowing back to the input side (input voltage Vin's side) flows directly from the source of the output transistor 111 to the input side through the drain of the output transistor 111 without passing through the body diode of the output transistor 111. Then, a relatively large amount of current may flow through the input side without being affected by the voltage drop caused by the body diode.

Therefore, by providing a rechargeable device such as a battery on the input side, it becomes possible to recover most of the electric charges stored in the capacitor 115, which makes it possible to improve the efficiency.

In this modification, as shown in FIG. 5, when the synchronous rectification transistor 112 is turned off, the output transistor 111 is turned on at the same time. Alternatively, the control circuit 140 may be configured to turn on the output transistor 111 when it detects that the synchronous rectification transistor 112 is turned off.

The power supply control apparatus (140) disclosed in the present disclosure includes: a driver (147) configured to respectively drive an output transistor (111) and a synchronous rectification transistor (112) configured to generate an output voltage (Vout) from an input voltage (Vin) and supply the output voltage (Vout) to a load (Z); and a controller (145) configured to, in a light load mode in which output feedback control is performed such that a switching frequency of the output transistor (111) becomes lower as the load (Z) becomes lighter, during an off period from a time at which both the output transistor (111) and the synchronous rectification transistor (112) are turned off to an on timing of the output transistor (111) based on the output feedback control, periodically turn on the synchronous rectification transistor (112) within a range in which a switching frequency does not fall below a predetermined lower limit value (First Configuration).

In the power supply control apparatus (140) of the First Configuration, the on timing of the output transistor (111) based on the output feedback control may be a time at which the output voltage (Vout) drops to a reference voltage (sv), and the controller (145) may be further configured to change an on time of the synchronous rectification transistor (112) during the off period such that the output voltage (Vout) does not fall below the reference voltage (sv) due to the turn-on of the synchronous rectification transistor (112) during the off period (Second Configuration).

In the power supply control apparatus (140) of the First Configuration, the controller (145) may be further configured to turn off the synchronous rectification transistor (112) after turning on the synchronous rectification transistor (112) during the off period, and turn on the output transistor (111) in synchronization with the turning-off of the synchronous rectification transistor (112) (Third Configuration).

In the power supply control apparatus (140) of the First Configuration, the lower limit value may be 25 kHz (Fourth Configuration).

In the power supply control apparatus (140) of any one of the First to Fourth Configurations, the apparatus may be integrated in a semiconductor device (200) (Fifth Configuration).

The switching power supply (100) disclosed in the present disclosure includes the power supply control apparatus (140) of any one of the First to Fourth Configurations (Sixth Configuration).

According to the power supply control apparatus (140) of the First Configuration, it is possible to suppress the switching frequency from falling below the predetermined lower limit value in the light load mode. Therefore, by setting the lower limit value to a value higher than the human audible band, it is possible to suppress generation of a noise that may be recognized by humans. Further, since the power supply control apparatus (140) is not configured to involve changing a value of the load (Z) or forcibly discharge the charges accumulated in the output capacitor, it is possible to suppress a decrease in efficiency.

Further, according to the power supply control apparatus (140) of the Second Configuration, it is possible to suppress the output voltage (Vout) from falling below the reference voltage (sv) by turning on the synchronous rectification transistor (112) during the off period. Therefore, even when the load is light (Z), it is possible to prevent the on timing of the output transistor (111) from becoming short based on the output feedback control, thereby suppressing a decrease in efficiency.

Further, according to the power supply control apparatus (140) of the Third Configuration, the current flows directly to the side of the input voltage (Vin) via the output transistor (111) without going through the body diode of the output transistor (111). For this reason, the flowing current is not affected by a voltage drop due to the body diode. Therefore, it is possible to allow a larger amount of current to flow, and it is possible to suppress a decrease in efficiency when adopting a configuration in which a battery or the like is provided on the side of the input voltage (Vin).

Further, according to the power supply control apparatus (140) of the Fourth Configuration, it is possible to prevent the switching frequency from becoming lower than 25 kHz, which is higher than the general human audible band, and it is possible to suppress generation of a noise in the switching power supply (100).

Moreover, according to the switching power supply (100) of the Sixth Configuration, it is possible to suppress generation of a noise while suppressing a decrease in efficiency.

The power supply control apparatus disclosed in the present disclosure may be used as a main controller of switching power supplies installed in various applications, thereby suppressing generation of a noise in the switching power supplies and suppressing a decrease in efficiency of the switching power supplies.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply control apparatus, comprising:
   a driver configured to respectively drive an output transistor and a synchronous rectification transistor configured to generate an output voltage from an input voltage and supply the output voltage to a load; and
   a controller configured to, in a light load mode in which output feedback control is performed such that a switching frequency of the output transistor becomes lower as the load becomes lighter, during an off period from a time at which both the output transistor and the synchronous rectification transistor are turned off to an on timing of the output transistor based on the output feedback control, periodically turn on the synchronous rectification transistor within a range in which the switching frequency does not fall below a predetermined lower limit value.

2. The power supply control apparatus of claim 1, wherein the on timing of the output transistor based on the output feedback control is a time at which the output voltage drops to a reference voltage, and
   wherein the controller is further configured to change an on time of the synchronous rectification transistor during the off period such that the output voltage does not fall below the reference voltage due to the turning-on of the synchronous rectification transistor during the off period.

3. The power supply control apparatus of claim 1, wherein the controller is further configured to turn off the synchronous rectification transistor after turning on the synchronous rectification transistor during the off period, and turn on the output transistor in synchronization with the turning-off of the synchronous rectification transistor.

4. The power supply control apparatus of claim 1, wherein the predetermined lower limit value is 25 kHz.

5. The power supply control apparatus of claim 1, wherein the power supply control apparatus is integrated in a semiconductor device.

6. A switching power supply, comprising:
   the power supply control apparatus of claim 1.

* * * * *